United States Patent
Akatsuka et al.

(10) Patent No.: US 12,332,664 B2
(45) Date of Patent: Jun. 17, 2025

(54) DISPLAY SYSTEM AND DISPLAY METHOD

(71) Applicant: TOYOTA JIDOSHA KABUSHIKI KAISHA, Toyota (JP)

(72) Inventors: Kosuke Akatsuka, Mishima (JP); Rio Suda, Toyota (JP); Takashi Suzuki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 17/976,092

(22) Filed: Oct. 28, 2022

(65) Prior Publication Data
US 2023/0145746 A1 May 11, 2023

(30) Foreign Application Priority Data

Nov. 11, 2021 (JP) .................................. 2021-183993

(51) Int. Cl.
*G05D 1/224* (2024.01)
*B60R 1/23* (2022.01)
(Continued)

(52) U.S. Cl.
CPC ............ *G05D 1/2247* (2024.01); *B60R 1/23* (2022.01); *B60R 1/24* (2022.01); *B60W 10/18* (2013.01);
(Continued)

(58) Field of Classification Search
CPC .... B60R 1/00; B60R 1/23; B60R 1/24; B60R 2300/305; B60W 10/18; B60W 50/14;
(Continued)

(56) References Cited

U.S. PATENT DOCUMENTS 5,748,476 A * 5/1998 Sekine ................... G01C 21/26
701/93
6,889,140 B2 * 5/2005 Isogai ................. B60T 8/17558
180/170
(Continued)

FOREIGN PATENT DOCUMENTS

JP 2004-262449 A 9/2004
JP 2005-319849 A 11/2005
(Continued)

OTHER PUBLICATIONS

Hayashi K, JP 2015196403 A, Nov. 9, 2015, machine translation (Year: 2015).*

(Continued)

*Primary Examiner* — Mark L. Greene
(74) *Attorney, Agent, or Firm* — Sughrue Mion, PLLC

(57) ABSTRACT

A display system according to the present disclosure includes a camera that captures a traveling image of a vehicle in a traveling direction, a display device, one or more storage devices that store a reference deceleration indicating a predetermined deceleration, and one or more processors. The one or more processors are configured to execute a process of acquiring a vehicle speed of the vehicle, a process of an estimated stop position indicating a stop position when braking is applied at the reference deceleration from the vehicle speed, and a process of displaying the estimated stop position to be superimposed on the traveling image on the display device.

8 Claims, 16 Drawing Sheets

(51) Int. Cl.
*B60R 1/24* (2022.01)
*B60W 10/18* (2012.01)
*B60W 50/14* (2020.01)
*G05D 1/00* (2006.01)

(52) U.S. Cl.
CPC .......... *B60W 50/14* (2013.01); *G05D 1/0212* (2013.01); *B60R 2300/305* (2013.01); *B60W 2050/146* (2013.01); *B60W 2420/403* (2013.01); *B60W 2520/10* (2013.01); *B60W 2520/105* (2013.01); *G05D 1/0038* (2013.01)

(58) Field of Classification Search
CPC ..... B60W 2050/146; B60W 2420/403; B60W 2520/10; B60W 2520/105; G05D 1/2247; G05D 1/00–12; G05D 1/0061; G05D 1/0088; G05D 1/021; G05D 1/0214; G05D 1/0221; G05D 1/0223; G05D 1/20–249; G05D 1/40–498; G05D 1/60–6987; G05D 1/80–87; G05D 2101/00–26; G05D 2103/00; G05D 2105/00–93; G05D 2107/00–95; G05D 2109/00–50; G05D 2111/00–67
See application file for complete search history.

(56) References Cited

U.S. PATENT DOCUMENTS

| | | | |
|---|---|---|---|
| 11,215,982 | B2 | 1/2022 | Urano et al. |
| 11,325,618 | B2 | 5/2022 | Umeda |
| 11,885,102 | B2* | 1/2024 | Spielman, Jr. ......... G05D 1/224 |
| 2009/0303080 | A1 | 12/2009 | Kadowaki et al. |
| 2010/0066833 | A1 | 3/2010 | Ohshima et al. |
| 2016/0152264 | A1 | 6/2016 | Watanabe et al. |
| 2019/0137999 | A1 | 5/2019 | Taguchi et al. |
| 2019/0377354 | A1 | 12/2019 | Shalev-Shwartz et al. |
| 2020/0209888 | A1 | 7/2020 | Sakai et al. |
| 2020/0326702 | A1 | 10/2020 | Iwamoto et al. |
| 2021/0041894 | A1 | 2/2021 | Urano et al. |
| 2021/0055741 | A1 | 2/2021 | Kawanai et al. |
| 2021/0058173 | A1 | 2/2021 | Otaki et al. |
| 2021/0072743 | A1 | 3/2021 | Otaki et al. |
| 2021/0080943 | A1 | 3/2021 | Iwamoto et al. |
| 2021/0171051 | A1 | 6/2021 | Takeda et al. |
| 2022/0128989 | A1* | 4/2022 | Ghorbanian-Matloob .................. G05D 1/0038 |
| 2022/0157164 | A1* | 5/2022 | Weslosky ............. G05D 1/0289 |
| 2022/0319186 | A1 | 10/2022 | Sasamoto et al. |
| 2023/0124375 | A1* | 4/2023 | Akatsuka ............... G06V 20/56 340/438 |

FOREIGN PATENT DOCUMENTS

| | | |
|---|---|---|
| JP | 2015-196403 A | 11/2015 |
| JP | 2018-41270 A | 3/2018 |
| JP | 2021-91261 A | 6/2021 |

OTHER PUBLICATIONS

U.S. Appl. No. 17/967,465, filed Oct. 17, 2022.
United States Office Action dated Feb. 26, 2024 in U.S. Appl. No. 17/967,465.

* cited by examiner

DISPLAY SYSTEM AND DISPLAY METHOD

CROSS-REFERENCE TO RELATED APPLICATION

This application claims priority to Japanese Patent Application No. 2021-183993 filed on Nov. 11, 2021, incorporated herein by reference in its entirety.

BACKGROUND

1. Technical Field

The present disclosure relates to a technique for displaying a traveling image of a vehicle on a display device.

2. Description of Related Art

In the related art, there has been considered a technique for supporting smooth driving operation by displaying an image captured by a camera provided in a vehicle on a display device and superimposing an auxiliary display on the display device.

For example, Japanese Unexamined Patent Application Publication No. 2004-262449 (JP 2004-262449 A) discloses a parking assist device that captures the rear of a vehicle using a camera when a parking operation is performed, displays the image captured by the camera on a display device provided in the vehicle as a rear image, and superimposes an estimated traveling locus that varies depending on a steering angle of a steering wheel on the rear image. In the parking device, a caution area that serves as the guideline for the distance behind the vehicle is superimposed and displayed on the display device.

SUMMARY

In a remote driving system or the like, a driver of a vehicle is required to visually check a traveling image displayed on a display device and perform a driving operation without actually boarding the vehicle. In such a case, the driver has a weak sense of driving such as a sense of distance, a sense of speed, and a sense of acceleration. In particular, the inventors of the present disclosure have confirmed the issue that when the driver attempts to stop the vehicle at a desired stop position in such a case, the vehicle stops excessively before the desired stop position.

One object of the present disclosure is to provide a display system and a display method capable of prompting an appropriate stop at a desired stop position.

A first disclosure relates to a display system. The display system according to the first disclosure includes: a camera that captures a traveling image of a vehicle in a traveling direction; a display device; one or more storage devices that store a reference deceleration indicating a predetermined deceleration; and one or more processors. The one or more processors are configured to execute a process of acquiring a vehicle speed of the vehicle, a stop position calculation process of calculating an estimated stop position indicating a stop position when braking is applied at the reference deceleration from the vehicle speed, and a process of displaying the estimated stop position to be superimposed on the traveling image on the display device.

A second disclosure relates to the display system according to the first disclosure that further has the following characteristics. The stop position calculation process includes: a process of calculating an estimated stop distance $x_p$ based an equation (1) below where the vehicle speed is v, the reference deceleration is $a_s$, and a constant is α; and a process of calculating a position advanced from the vehicle along a traveling path by the estimated stop position as the estimated stop position.

(First equation)

$$x_p = \alpha * \frac{v^2}{a_s} \quad (1)$$

A third disclosure relates to the display system according to the first or the second disclosure that further has the following characteristics. The one or more processors are configured to further execute: a process of recognizing a stop line captured in the traveling image and calculating a position of the stop line; and a process of varying a display form of the estimated stop position depending on whether the estimated stop position is before the position of the stop line or the estimated stop position is behind the position of the stop line.

A fourth disclosure relates to the display system according to any one of the first to the third disclosures that further has the following characteristics. The one or more processors are configured to further execute: a process of accepting an input of a set value of the reference deceleration; and a process of changing the reference deceleration stored in the one or more storage devices in accordance with the set value.

A fifth disclosure relates to the display system according to any one of the first to the third disclosures that further has the following characteristics. The one or more storage devices store proficiency level information indicating a proficiency level with respect to a specific driver of the vehicle. The one or more processors are configured to further execute a process of changing the reference deceleration stored in the one or more storage devices to increase as the proficiency level becomes higher based on the proficiency level information.

A sixth disclosure relates to the display system according to any one of the first to the fifth disclosures that further has the following characteristics. The reference deceleration includes a first reference deceleration, a second reference deceleration that is smaller than the first reference deceleration by a predetermined value, and a third reference deceleration that is variable between the first reference deceleration and the second reference deceleration. The one or more processors are configured to further execute: a process of acquiring braking state information of the vehicle; a process of determining a start of braking of the vehicle based on the braking state information; and a process of gradually changing, from a time of the start of braking, the third reference deceleration to the first reference deceleration corresponding to an elapsed time or based on the braking state information, with the second reference deceleration as an initial value. The stop position calculation process includes a process of calculating the estimated stop position based on the second reference deceleration until the time of the start of braking, a process of calculating the estimated stop position based on the third reference deceleration from the time of the start of braking until the third reference deceleration reaches the first reference deceleration, and a process of calculating the estimated stop position based on the first reference deceleration after the third reference deceleration reaches the first reference deceleration.

A seventh disclosure relates to a display method for displaying a traveling image of a vehicle in a traveling direction on a display device. The traveling image is captured by a camera. The display method according to the seventh disclosure includes: calculating an estimated stop position indicating a stop position when braking is applied at a reference deceleration indicating a predetermined deceleration from a vehicle speed of the vehicle; and displaying the estimated stop position to be superimposed on the traveling image on the display device.

An eighth disclosure relates to the display method according to the seventh disclosure that further has the following characteristics. The calculating the estimated stop position includes: calculating an estimated stop distance $x_p$ based an equation (1) below where the vehicle speed is v, the reference deceleration is $a_s$, and a constant is $\alpha$; and calculating a position advanced from the vehicle along a traveling path by the estimated stop position as the estimated stop position.

(Second equation)

$$x_p = \alpha * \frac{v^2}{a_s} \quad (1)$$

A ninth disclosure relates to the display method according to the seventh or the eighth disclosure that further has the following characteristics. The display method according to the ninth disclosure further includes: recognizing a stop line captured in the traveling image and calculating a position of the stop line; and varying a display form of the estimated stop position depending on whether the estimated stop position is before the position of the stop line or the estimated stop position is behind the position of the stop line.

A tenth disclosure relates to the display method according to any one of the seventh to the ninth disclosures that further has the following characteristics. The display method according to the tenth disclosure further includes: accepting an input of a set value of the reference deceleration; and changing the reference deceleration in accordance with the set value.

An eleventh disclosure relates to the display method according to any one of the seventh to the ninth disclosures that further has the following characteristics. The display method according to the eleventh disclosure further includes: managing proficiency level information indicating a proficiency level with respect to a specific driver of the vehicle; and changing the reference deceleration to increase as the proficiency level becomes higher based on the proficiency level information.

A twelfth disclosure relates to the display method according to any one of the seventh to the eleventh disclosures that further has the following characteristics. The reference deceleration includes a first reference deceleration, a second reference deceleration that is smaller than the first reference deceleration by a predetermined value, and a third reference deceleration that is variable between the first reference deceleration and the second reference deceleration. The display method according to the twelfth disclosure further includes: acquiring braking state information of the vehicle, determining a start of braking of the vehicle based on the braking state information, and gradually changing, from a time of the start of braking, the third reference deceleration to the first reference deceleration corresponding to an elapsed time or based on the braking state information, with the second reference deceleration as an initial value. The calculating the estimated stop position includes: calculating the estimated stop position based on the second reference deceleration until the time of the start of braking; calculating the estimated stop position based on the third reference deceleration from the time of the start of braking until the third reference deceleration reaches the first reference deceleration; and calculating the estimated stop position based on the first reference deceleration after the third reference deceleration reaches the first reference deceleration.

According to the present disclosure, the estimated stop position is displayed to be superimposed on the traveling image in the traveling direction. Further, the estimated stop position is a stop position when braking is applied at the reference deceleration from the vehicle speed of the vehicle. With the above, when the driver attempts to stop the vehicle at a desired stop position, it is possible to urge the driver to appropriately stop at the desired stop position. In particular, the issue that, even when the driver visually checks the traveling image displayed on the display device and performs the driving operation without actually boarding the vehicle, the vehicle stops excessively before the desired stop position can be solved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. However, when the number, quantity, amount, range, etc. of each element are mentioned in the embodiments shown below, the ideas pertaining to the present disclosure are not limited to the mentioned number, except when the number is explicitly stated or clearly specified in principle. Further, the configurations and the like described in the embodiments shown below are not necessarily essential to the ideas of the present disclosure, except when explicitly stated or when clearly specified in principle. In each figure, the same or corresponding parts are designated by the same reference symbols, and the duplicated description thereof will be appropriately simplified or omitted.

1. First Embodiment

1-1. Introduction

When stopping a vehicle at a desired stop position such as a stop line is attempted, it can be considered that a driving operation by a driver of the vehicle is performed as follows. First, the driver determines the start of braking. At this time, the driver estimates a braking distance on the assumption that braking is applied at a predetermined deceleration, and determines the start of braking in accordance with the remaining distance from the current position to the stop position. Next, the driver performs a driving operation (typically, depression of a brake pedal) so as to decelerate the vehicle to achieve a predetermined deceleration. At this time, the driver performs the driving operation while visually observing the scenery in the traveling direction and confirming the deceleration of the vehicle based on the G applied to the driver. Finally, the driver stops the vehicle so as to align the vehicle at the stop position. At this time, the driver performs the driving operation while confirming the deceleration of the vehicle so as to stop at the stopped position.

In a remote driving system or the like, the driver of the vehicle is required to visually check a traveling image displayed on a display device and perform the driving operation without actually boarding the vehicle. The inventors of the present disclosure have confirmed the issue that when the driver tries to stop the vehicle at a desired stop position in such a case, the vehicle stops excessively before the desired stop position.

Figure 1:
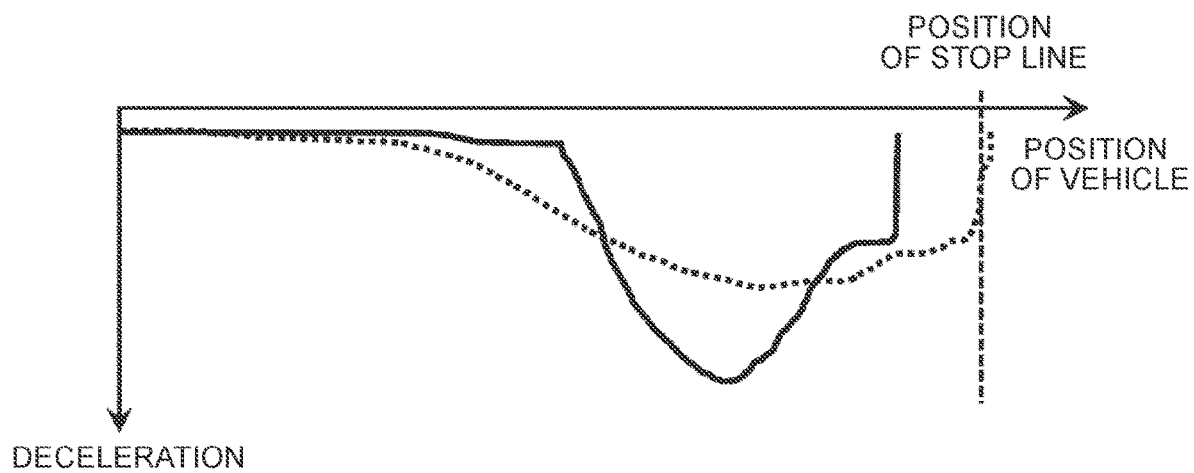
FIG. 1 is a graph showing a case where a driver visually checks a traveling image displayed on a display device and performs a driving operation without actually boarding the vehicle, and showing an example of typical deceleration of the vehicle when the driver attempts to stop the vehicle at a stop line.

FIG. 1 is a graph showing a case where the driver visually checks a traveling image displayed on the display device and performs the driving operation without actually boarding the vehicle, and showing an example of typical deceleration of the vehicle when the driver attempts to stop the vehicle at the stop line. As a comparison, FIG. 1 also shows an example (dotted line) of typical deceleration of the vehicle when the driver who is on board the vehicle attempts to stop the vehicle at the stop line. FIG. 1 shows the deceleration of the vehicle with respect to the position of the vehicle. Here, in FIG. 1, the vertical axis indicates the magnitude (absolute value) of deceleration. Further, FIG. 1 shows the position of the stop line (broken line).

As shown in FIG. 1, in the driving operation performed by visually checking the traveling image, the vehicle is stopped excessively before the stop line. This is because when the driver visually checks the traveling image displayed on the display device and performs the driving operation without actually boarding the vehicle, the sense of driving (a sense of distance, a sense of speed, and a sense of acceleration) is weakened. In the example shown in FIG. 1, excessive deceleration occurs and the deceleration is not stable in the driving operation performed by visually checking the traveling image. Further, there is a tendency that the timing of the start of braking is not determined in the driving operation performed by visually checking the traveling image.

In order to cope with the above-mentioned issue, a display system according to a first embodiment displays the estimated stop position when the vehicle is stopped to be superimposed on the traveling image. Further, the display system has a characteristic in how to give the estimated stop position. Hereinafter, the outline of the display system according to the first embodiment will be described.

1-2. Outline

The display system according to the first embodiment provides a function of displaying a traveling image of a vehicle on a display device. Here, the traveling image of the vehicle includes a traveling image of the vehicle in the traveling direction, and is captured by a camera provided in the vehicle. In particular, the display system according to the first embodiment displays the estimated stop position of the vehicle to be superimposed on the traveling image in the traveling direction. The display of the estimated stop position of the vehicle is one of the augmented reality (AR) displays. Hereinafter, the function of displaying the estimated stop position of the vehicle to be superimposed on the traveling image is also referred to as an "AR display function". It is conceivable that such a display system is adopted in a remote driving system in which a driving operation is performed by visually checking a traveling image displayed on a display device.

Figure 2:
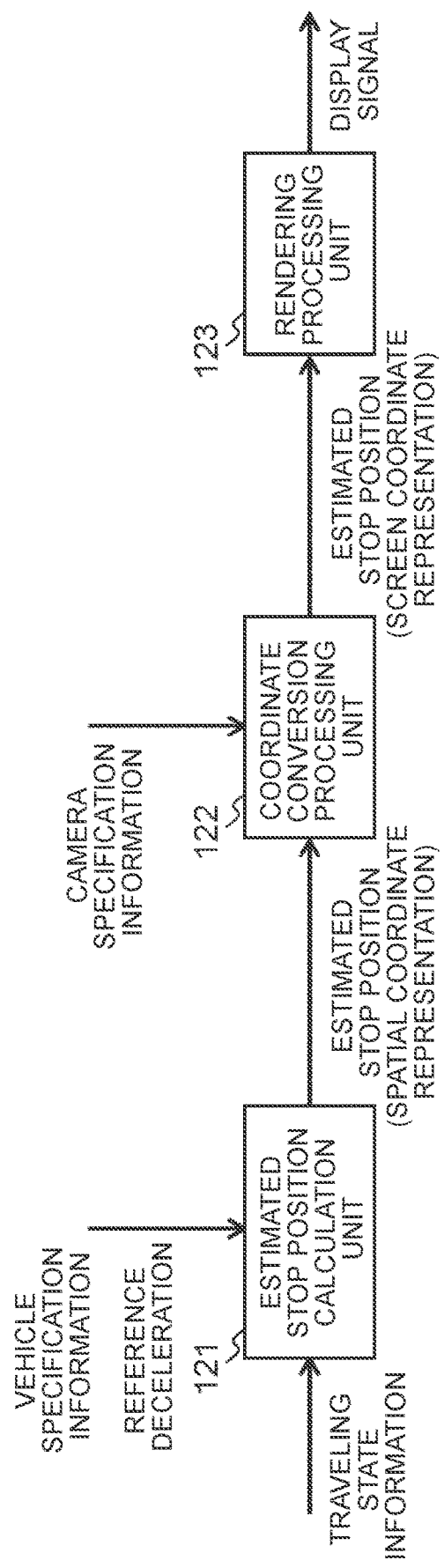
FIG. 2 is a block diagram for explaining an AR display function by a display system according to a first embodiment.

FIG. 2 is a block diagram for explaining the AR display function by the display system according to the first embodiment. The AR display function is composed of an estimated stop position calculation processing unit 121, a coordinate conversion processing unit 122, and a rendering processing unit 123.

First, the estimated stop position calculation processing unit 121 acquires traveling state information of the vehicle, vehicle specification information, and reference deceleration indicating a predetermined deceleration, and calculates the estimated stop position of the vehicle. Here, the reference deceleration is a predetermined value and is stored in a storage device and managed. Further, the traveling state information of the vehicle includes at least the current vehicle speed of the vehicle. In addition, acceleration and deceleration and a steering angle are exemplified as the traveling state information of the vehicle. The vehicle weight, the stability factor, the cornering power, the wheelbase, and the steering gear ratio are exemplified as the vehicle specification information.

Figure 3:
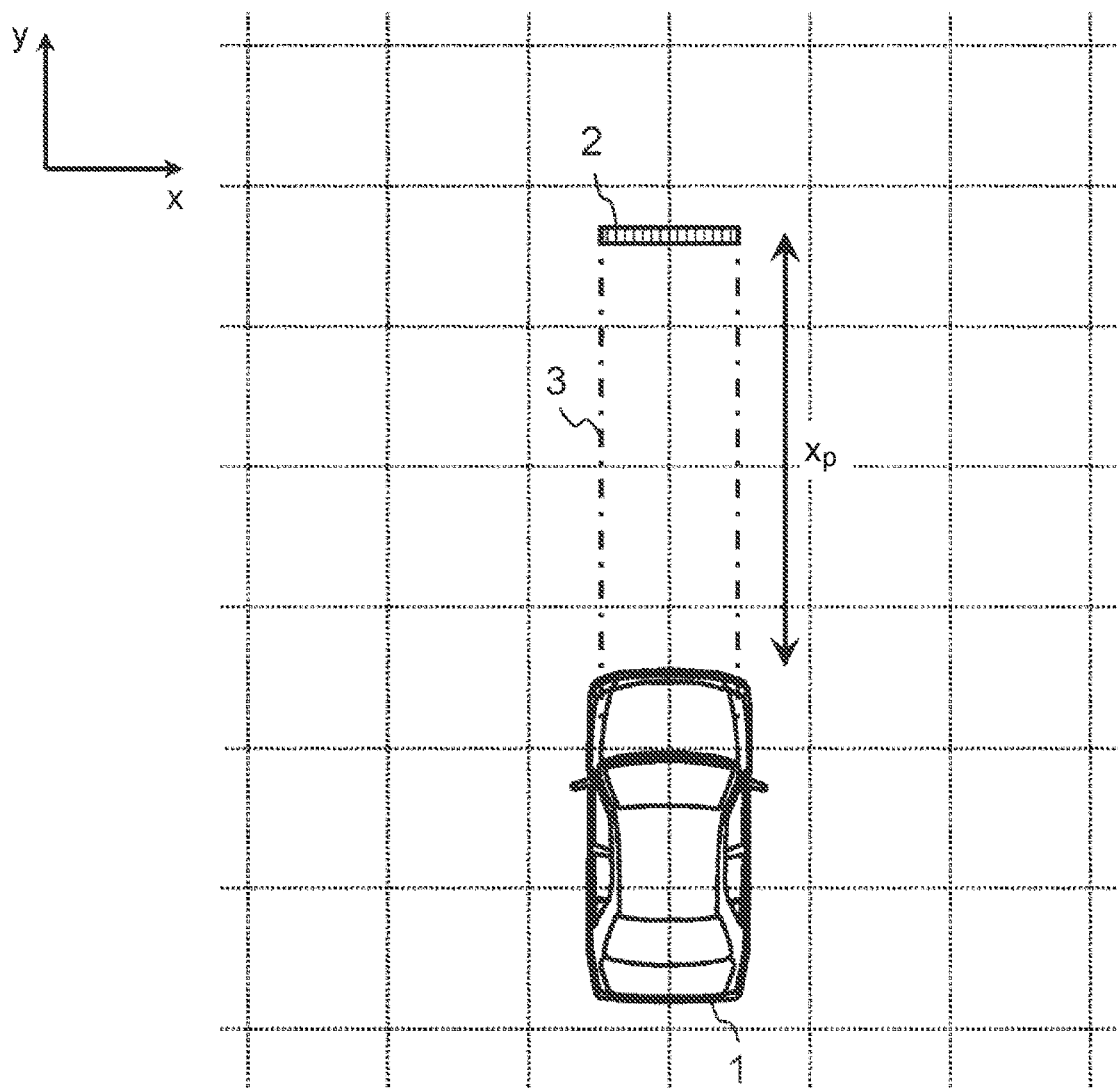
FIG. 3 shows an example of an estimated stop position of the vehicle calculated by an estimated stop position calculation processing unit shown in FIG. 2.
Figure 4:
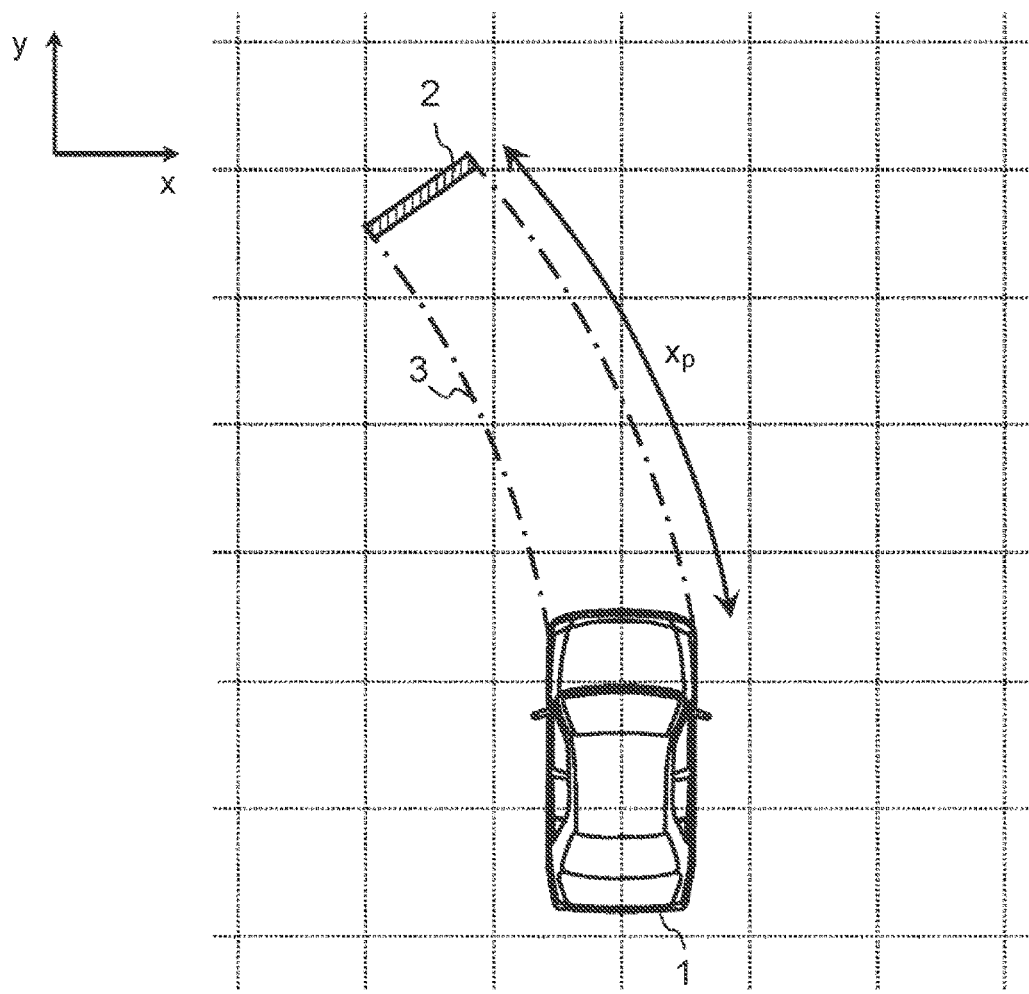
FIG. 4 shows an example of the estimated stop position of the vehicle when a traveling path is a turning path.

In the estimated stop position calculation processing unit 121, the estimated stop position of the vehicle is given a representation in spatial coordinates (spatial coordinate representation) as a processing result. FIG. 3 shows an example of an estimated stop position 2 of the vehicle 1 calculated by the estimated stop position calculation processing unit 121. In the example shown in FIG. 3, the spatial coordinates are two-dimensional Cartesian coordinates. Therefore, the estimated stop position 2 is represented by two-dimensional coordinates (x, y). As shown in FIG. 3, the estimated stop position 2 is a position advanced by $x_p$ (estimated stop distance) from the vehicle 1 along a traveling path 3. Here, when the vehicle 1 is steered, the traveling path 3 may be a turning path. In this case, the traveling path 3 can be calculated from the traveling state information and the vehicle specification information. FIG. 4 shows an example of the estimated stop position 2 of the vehicle 1 when the traveling path 3 is a turning path.

The estimated stop position 2 calculated by the estimated stop position calculation processing unit 121 is characterized by being a stop position when the vehicle 1 is braked at a reference deceleration from the current vehicle speed of the vehicle 1. That is, the estimated stop distance $x_p$ is the braking distance at the reference deceleration. Therefore, when the current vehicle speed of the vehicle 1 is v and the reference deceleration is $a_s$(<0), the estimated stop distance $x_p$ is calculated by the following equation (1). Note that α is a constant, typically −½. However, it may be a parameter adjusted according to the environment.

(Third equation)

$$x_p = \alpha * \frac{v^2}{a_s} \quad (1)$$

FIG. 2 is referred again. Next, the coordinate conversion processing unit 122 performs coordinate conversion of the estimated stop position 2 calculated by the estimated stop position calculation processing unit 121 based on the specification information (camera specification information) of the camera that captures the traveling image, and calculates the representation (screen coordinate representation) in the screen coordinates of the estimated stop position 2. Here, as the camera specification information, the installation position, the installation angle, and the angle of view of the camera are exemplified. Further, the screen coordinates gives a position on the image captured by the camera, and the position of the screen coordinates can be given so as to correspond to the position of the spatial coordinates.

Figure 5:
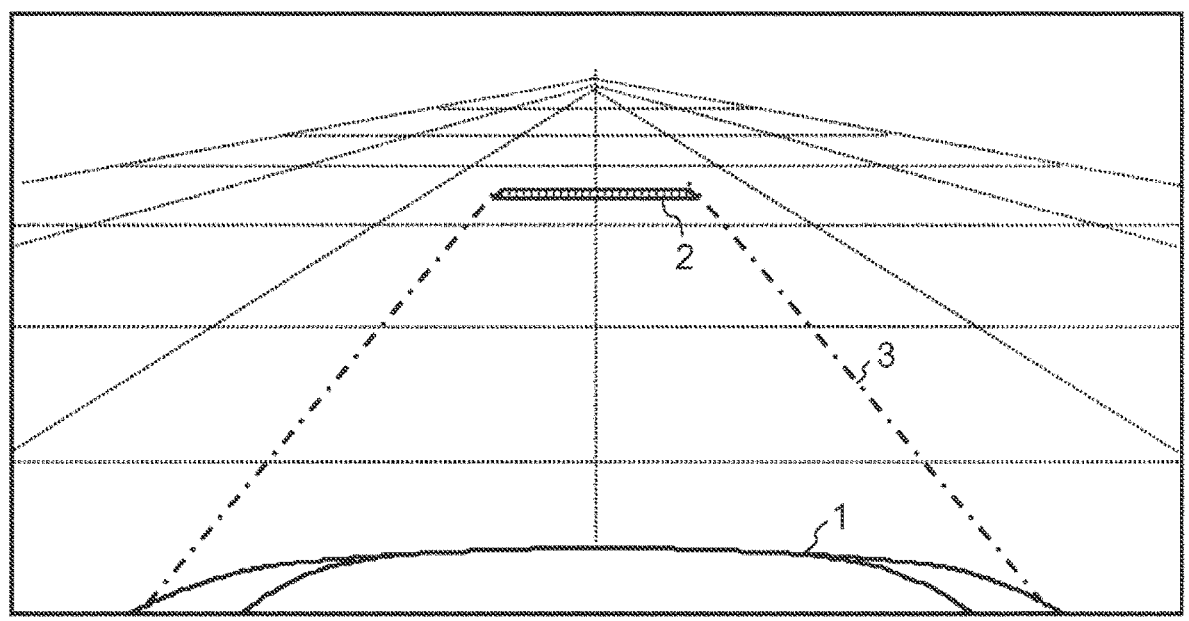
FIG. 5 shows an example of the estimated stop position of the vehicle calculated by a coordinate conversion processing unit shown in FIG. 2.

FIG. 5 shows an example of the estimated stop position 2 calculated by the coordinate conversion processing unit 122. FIG. 5 shows a screen coordinate representation of the estimated stop position 2 corresponding to the spatial coordinate representation of the estimated stop position 2 shown in FIG. 3.

FIG. 2 is referred again. Next, the rendering processing unit 123 generates a display signal for making the AR display of the estimated stop position 2 calculated by the coordinate conversion processing unit 122 on the display device. The AR display of the estimated stop position 2 is realized as the display device performs a display in accordance with the display signal generated by the rendering processing unit 123.

Figure 6:
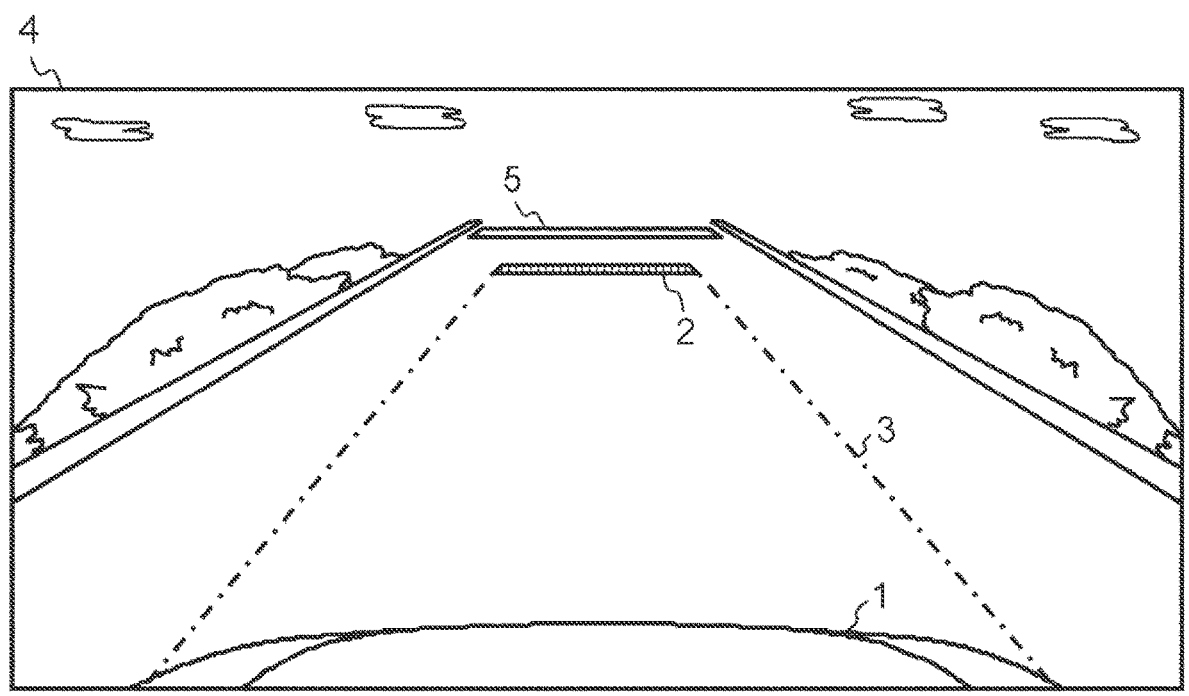
FIG. 6 is a conceptual diagram showing an example of a traveling image of the vehicle in a traveling direction realized by the display system according to the first embodiment.

FIG. 6 shows an example of a traveling image 4 of the vehicle 1 in the traveling direction realized by the display system according to the first embodiment. FIG. 6 shows the traveling image 4 in a situation where the vehicle 1 travels before a stop line 5. In the example of the traveling image 4 shown in FIG. 6, the AR display is also performed for the traveling path 3. In this case, the coordinate conversion processing unit 122 and the rendering processing unit 123 perform coordinate conversion and generation of a display signal for the traveling path 3. The visibility of the estimated stop position 2 can be improved by performing the AR display of the traveling path 3 as well.

As described above, in the display system according to the first embodiment, the estimated stop position 2 is displayed to be superimposed on the traveling image 4 in the traveling direction. Further, in the display system according to the first embodiment, the estimated stop position 2 is a stop position when braking is applied at the reference deceleration indicating a predetermined deceleration from the current vehicle speed of the vehicle 1. With the above, an effect capable of solving the issue that, even when the driver visually checks the traveling image 4 displayed on the display device and performs the driving operation without actually boarding the vehicle, the vehicle stops excessively before the desired stop position can be achieved. Hereinafter, the effect of the AR display function of the estimated stop position 2 will be described.

Figure 7A:
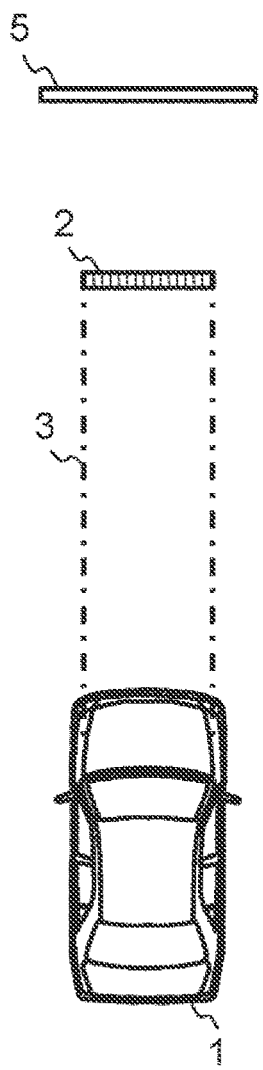
FIGS. 7A to 7C are conceptual diagrams for illustrating a first effect of the AR display function of the estimated stop position.
Figure 7B:
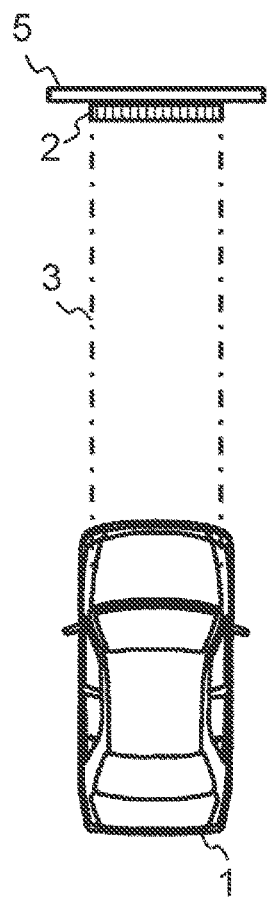
Figure 7C:
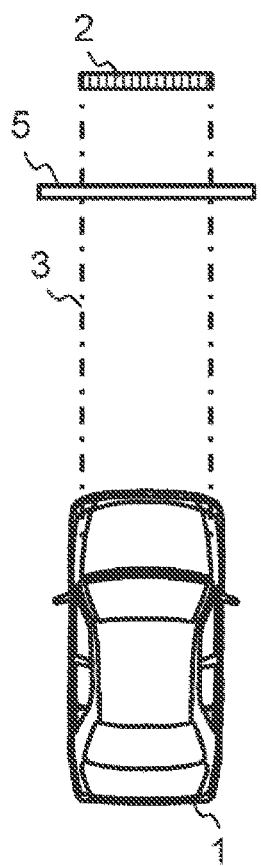

A first effect of the AR display function of the estimated stop position 2 is that the driver can understand the timing of the start of braking. FIGS. 7A to 7C are conceptual diagrams for illustrating the first effect of the AR display function of the estimated stop position 2. FIGS. 7A to 7C show cases where the driver attempts to stop the vehicle 1 at the stop line 5, and show three situation diagrams in which the positional relationships between the estimated stop position 2 and the stop line 5 are different among FIG. 7A, FIG. 7B, and FIG. 7C.

The driver can confirm the difference between the braking distance at the reference deceleration and the remaining distance from the current position to the stop line 5 as the AR display of the estimated stop position 2 is performed. As a result, the driver can understand the situation where estimated stop position 2 comes close to the stop line 5 as the timing of starting braking as shown in FIG. 7B. Further, in the situation shown in FIG. 7A, the driver can understand that it is not the timing to start braking or braking is started too early, and in the situation shown in FIG. 7C, braking should be started immediately or the start of braking is being delayed.

Figure 8A:
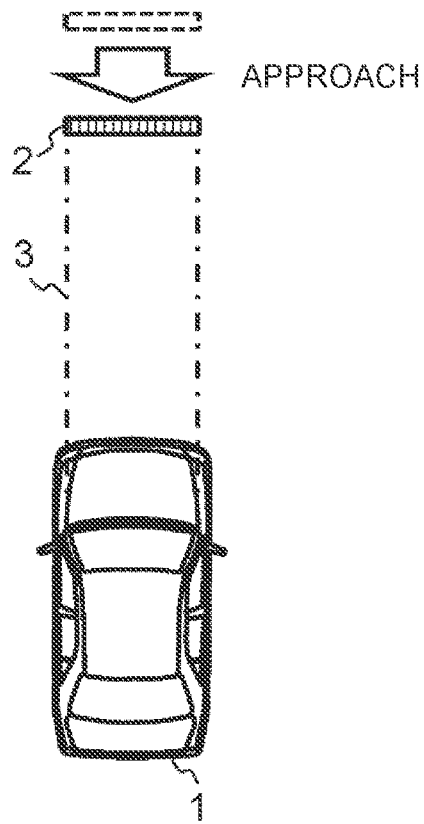
FIGS. 8A and 8B are conceptual diagrams for illustrating a second effect of the AR display function of the estimated stop position.
Figure 8B:
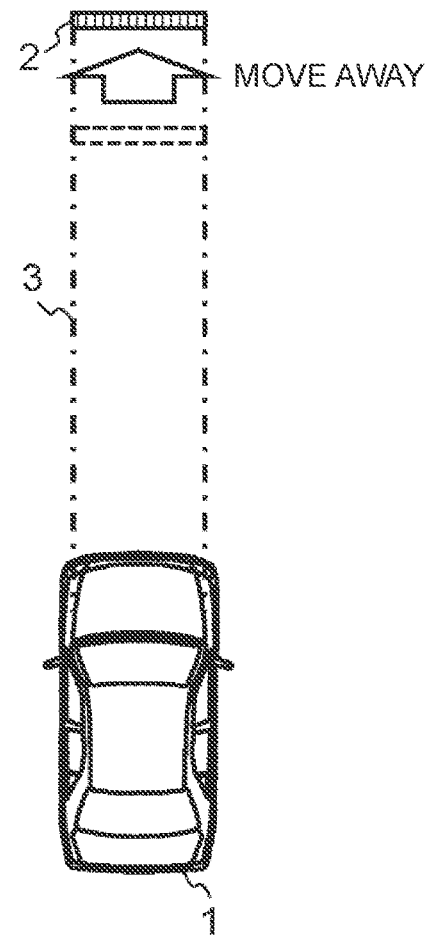

A second effect of the AR display function of the estimated stop position 2 is that the driver can understand the difference between the current deceleration of the vehicle 1 and the reference deceleration. FIGS. 8A and 8B are conceptual diagrams for illustrating the second effect of the AR display function of the estimated stop position 2. FIG. 8A shows an example of a case where the current deceleration of the vehicle 1 has a larger absolute value than the reference deceleration, and FIG. 8B shows an example of a case where the current deceleration of the vehicle 1 has a smaller absolute value than the reference deceleration. Hereinafter, "large" or "small" regarding the relationship between the deceleration of the vehicle 1 and the reference deceleration is assumed to be an absolute value.

As shown in FIG. 8A, when the current deceleration of the vehicle 1 is larger than the reference deceleration, the estimated stop position 2 is displayed so as to approach the vehicle 1. As shown in FIG. 8B, when the current deceleration of the vehicle 1 is smaller than the reference deceleration, the estimated stop position 2 is displayed so as to move away from the vehicle 1. That is, when the display of the estimated stop position 2 is maintained without moving, this indicates that the deceleration of the vehicle 1 is the reference deceleration. As described above, the driver can understand the difference between the current deceleration of the vehicle 1 and the reference deceleration from the movement of the display of the estimated stop position 2. As a result, the driver can perform the driving operation such that the deceleration of the vehicle 1 reaches the reference deceleration by confirming the display of the estimated stop position 2.

The speed at which the estimated stop position 2 approaches or moves away in the spatial coordinate representation can be expressed by the following equation (2). Here, a (<0) is the current deceleration of the vehicle 1. In the equation (2), the direction approaching the estimated stop position 2 is positive. Also by referring to the equation (2), it can be understood that the estimated stop position 2 approaches when the current deceleration of vehicle 1 is smaller than the reference deceleration, and the estimated stop position 2 moves away when the current deceleration of vehicle 1 is larger than the reference deceleration.

(Fourth equation)

$$v\left(\frac{a}{a_s} - 1\right) \quad (2)$$

Figure 9A:
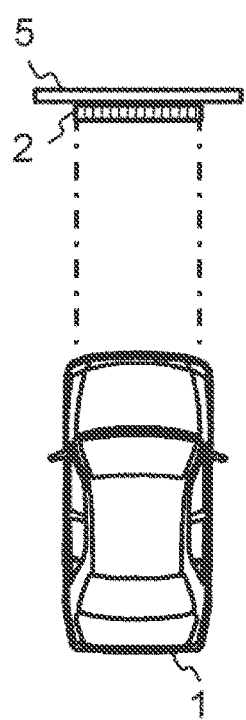
FIGS. 9A to 9C are conceptual diagrams for illustrating that an issue is solved by the AR display function of the estimated stop position.
Figure 9B:
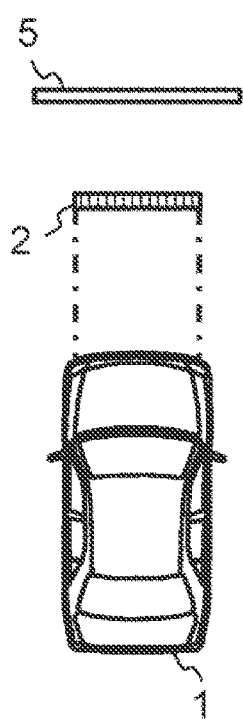
Figure 9C:
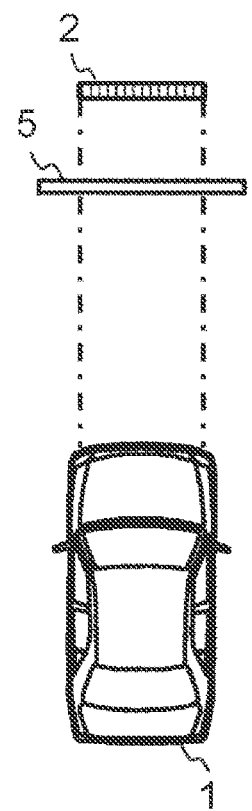

Achievement of the first effect and the second effect described above makes it possible to solve the issue that, when the driver attempts to stop the vehicle 1 at a desired stop position, the vehicle stops excessively before the desired stop position. Solution of the issue will be described with reference to FIGS. 9A to 9C. In FIGS. 9A to 9C, the desired stop position is the stop line 5.

First, due to the first effect, the driver can set the timing of starting braking in a situation where the estimated stop position 2 comes close to the stop line 5. This means that when the vehicle 1 is braked at the reference deceleration, the vehicle 1 can be stopped close to the stop line 5. That is, after braking is started, the driver can stop the vehicle 1 close to the stop line 5 by performing the driving operation such that the deceleration of the vehicle 1 reaches the reference deceleration.

Then, according to the second effect, the driver can perform the driving operation such that the deceleration of the vehicle 1 reaches the reference deceleration by confirming the display of the estimated stop position 2. That is, as shown in FIG. 9A, the driver can perform the driving operation such that the estimated stop position 2 is maintained close to the stop line 5. With the above, the vehicle 1 can be stopped close to the stop line 5.

However, depending on the situation of the driving operation by the driver and the delay in the driving operation, the situation shown in FIG. 9B or FIG. 9C may occur after braking is started. Even in this case, the driver can perform the driving operation such that the estimated stop position 2 comes close to the stop line 5 by confirming the display of the estimated stop position 2. For example, in the situation shown in FIG. 9B, the driver can understand that the driver only needs to loosen braking of the vehicle 1 (typically, to reduce the operation amount of the brake pedal) so as to make the deceleration of the vehicle 1 smaller than the reference deceleration. With the above, the estimated stop position 2 moves away from the vehicle 1, and the estimated stop position 2 can come close the stop line 5. On the other hand, in the situation shown in FIG. 9C, the driver can understand that the driver only needs to strengthen braking of the vehicle 1 (typically, to increase the operation amount of the brake pedal) so as to make the deceleration of the vehicle 1 larger than the reference deceleration. With the above, the estimated stop position 2 moves to approach the vehicle 1, and the estimated stop position 2 can come close to the stop line 5. After the driving operation is performed such that the estimated stop position 2 comes close to the stop line 5, the vehicle 1 can be stopped close to the stop line 5 as the driver performs the driving operation such that the estimated stop position 2 is maintained close to the stop line 5.

As described above, the AR display function of the estimated stop position 2 according to the first embodiment can solve the issue that the vehicle stops excessively before the desired stop position.

For the estimated stop position 2, it seems that the reference deceleration can be given as the current deceleration of the vehicle 1. However, when the current deceleration of the vehicle 1 is used instead of the reference deceleration, the estimated stop position 2 is not displayed until braking of the vehicle 1 is started. That is, the first effect cannot be achieved. Further, also for the second effect, the movement of the estimated stop position 2 affects the jerk and becomes hypersensitive. As a result, the driving operation corresponding to the movement of the estimated stop position 2 becomes difficult.

Further, as another form of the AR display, it is conceivable to perform the AR display of the position of the vehicle 1 after a predetermined time corresponding to the vehicle speed of the current vehicle 1. It is possible to achieve the first effect by providing the AR display as described above. However, in the AR display as described above, the driver cannot understand the deceleration of the vehicle 1 (this means that the second effect is not achieved), and it becomes difficult to perform the driving operation such that the AR display of the estimated stop position 2 comes close to the stop line 5. As a result, an accuracy of the stop position is deteriorated.

As described above, the first effect and the second effect can be sufficiently achieved by performing the AR display of the estimated stop position 2 as the stop position when braking is applied from the current vehicle speed of the vehicle 1 at the reference deceleration.

Figure 10A:
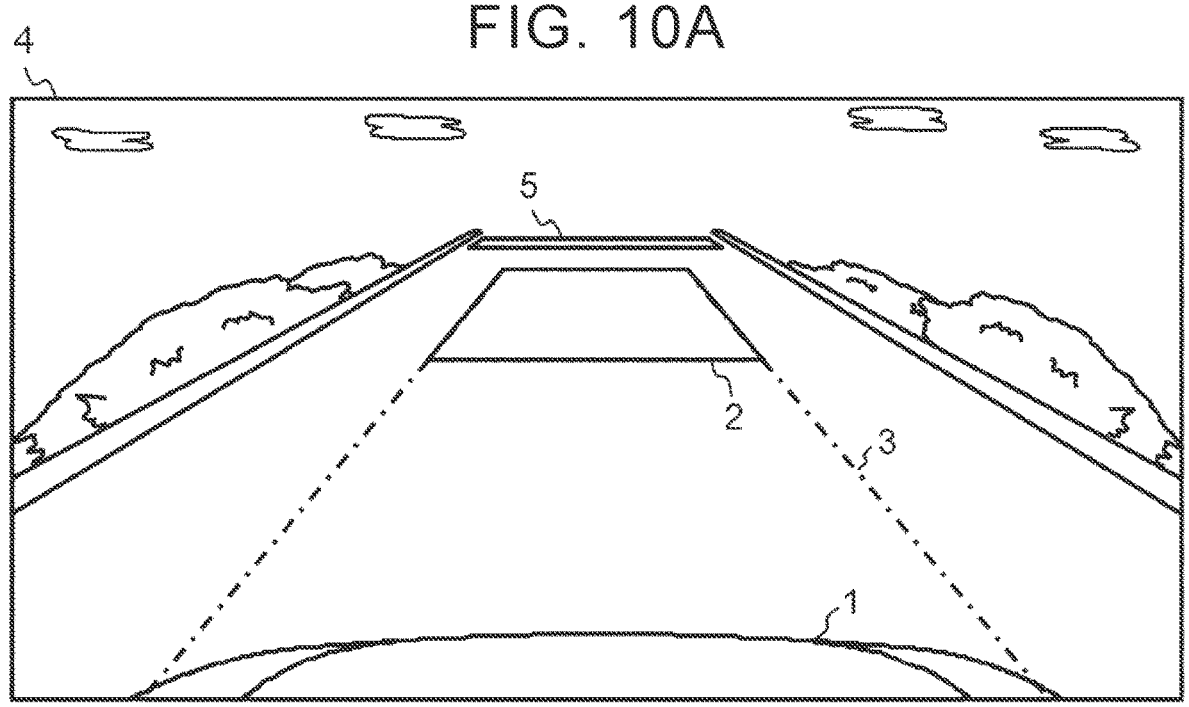
FIGS. 10A and 10B are conceptual diagrams showing examples of other display forms of the estimated stop position.
Figure 10B:
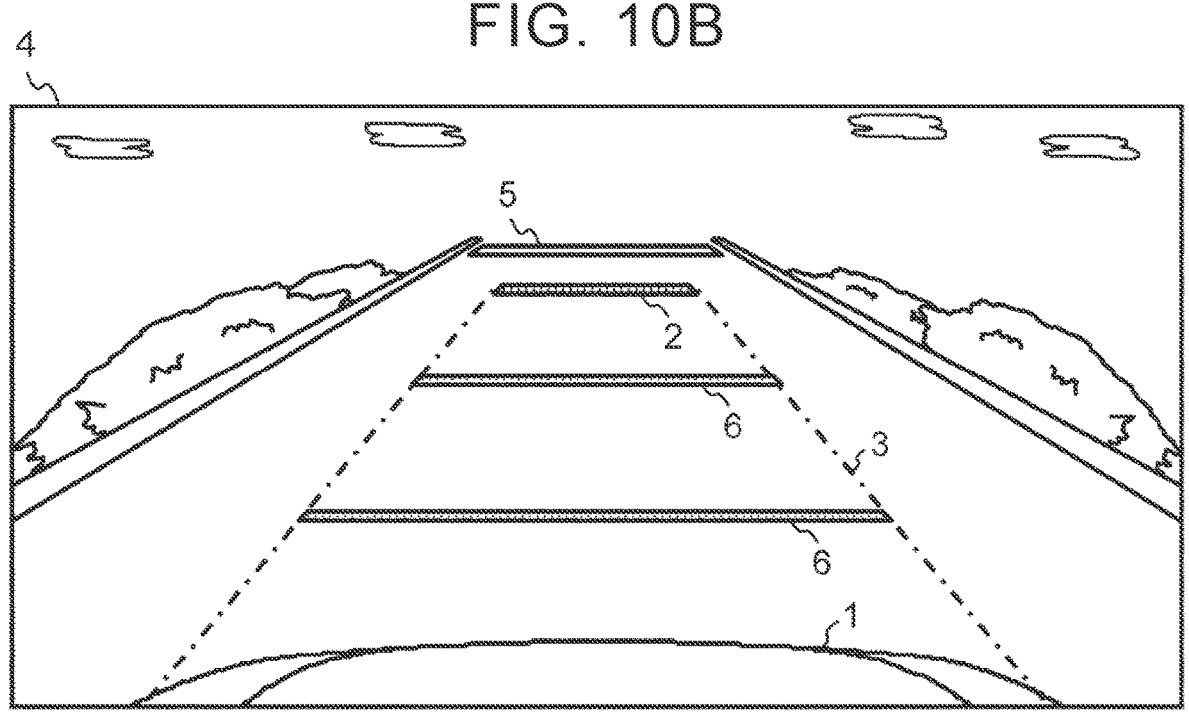

In addition, as the display form of the estimated stop position 2, other forms may be adopted. FIGS. 10A and 10B are conceptual diagrams showing examples of other display forms of the estimated stop position 2. Two examples of FIGS. 10A and 10B are shown as other forms of the display of the estimated stop position 2. FIG. 10A shows a case where the estimated stop position 2 is set as a frame that matches the length of the vehicle 1. By performing the AR display as described above, it is possible to confirm the position of the entire vehicle body at the estimated stop position 2. FIG. 10B shows a case where vehicle width lines 6 are displayed at predetermined intervals on the traveling path 3 leading to the estimated stop position 2, together with the AR display of the estimated stop position 2. By performing the AR display as described above, the driver can confirm the scale of the distance on the traveling image. As a result, the sense of distance by the driver can be improved.

The AR display as described above can be realized by configuring the estimated stop position calculation processing unit 121 so as to calculate the spatial coordinate representation of the estimated stop position 2 in accordance with the display form.

1-3. Display System

Figure 11:
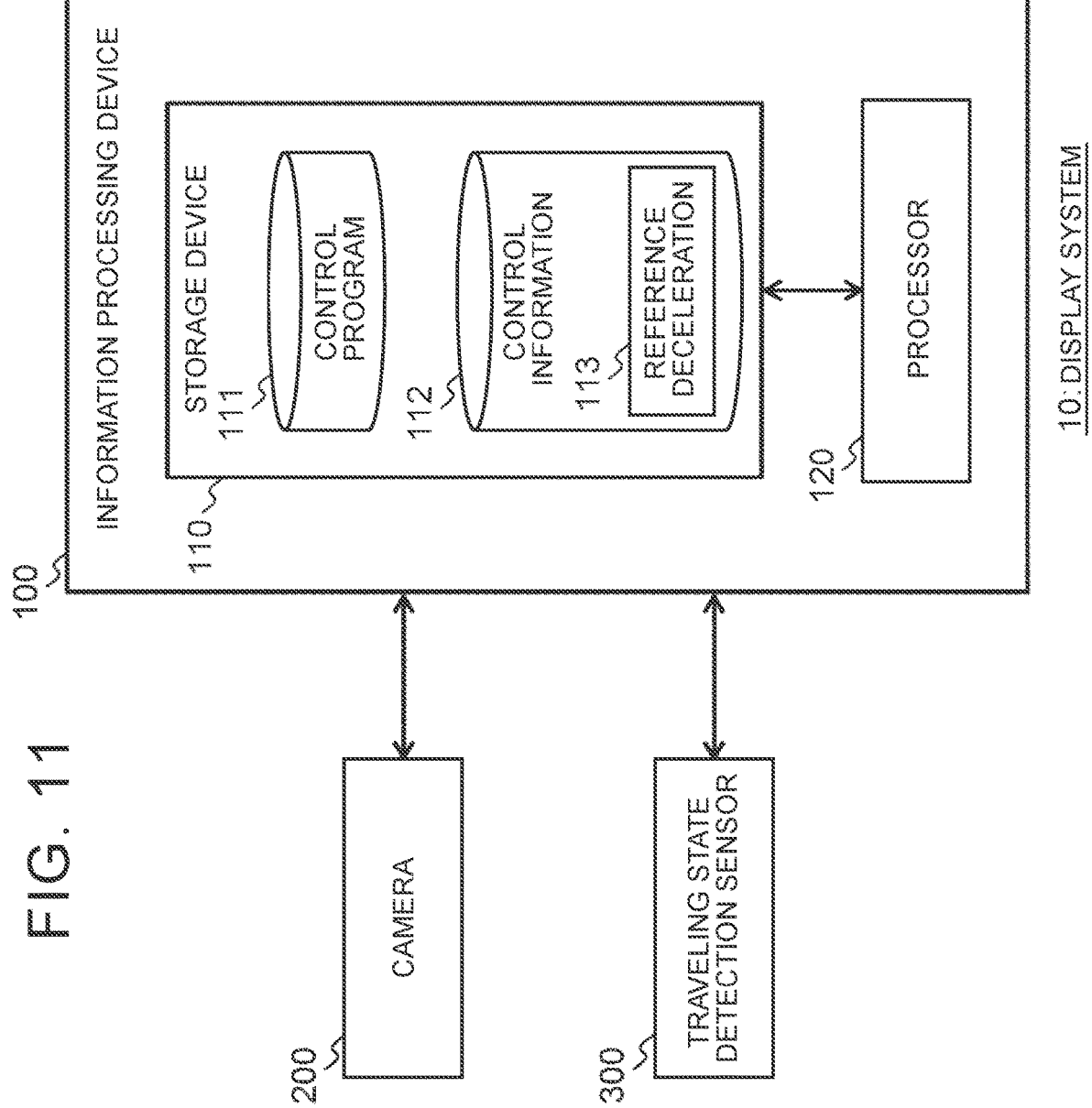
FIG. 11 is a block diagram showing a schematic configuration of the display system according to the first embodiment.

Hereinafter, the configuration of the display system according to the first embodiment will be described. FIG. 11 is a block diagram showing a schematic configuration of a display system 10 according to the first embodiment. The display system 10 includes an information processing device 100, a camera 200, a traveling state detection sensor 300, a display device 400, and an input device 500. The information processing device 100 is connected to the camera 200, the traveling state detection sensor 300, the display device 400, and the input device 500 so as to be able to transmit and receive information to and from each other. For example, an electric connection via a cable, a connection via an optical communication line, a connection by wireless communication via a wireless communication terminal, and the like can be exemplified. Note that, information may be transmitted and received indirectly via a relay device.

The camera 200 is provided in the vehicle 1 and captures the traveling image of the vehicle 1. The traveling image captured by the camera 200 is transmitted to the information processing device 100.

The traveling state detection sensor 300 is a sensor that detects the traveling state information of the vehicle 1 and outputs the detection information. The traveling state detection sensor 300 includes at least a sensor (for example, a wheel speed sensor) that detects the vehicle speed of the vehicle 1. In addition, examples of the traveling state detection sensor 300 include an acceleration sensor that detects the acceleration and deceleration of the vehicle 1 and a steering angle sensor that detects the steering angle of the vehicle 1. The detection information is transmitted to the information processing device 100.

The information processing device 100 is a computer that outputs a display signal that controls the display of the display device 400 based on the acquired information. The information processing device 100 may be a computer that outputs a display signal as one of the functions. For example, the information processing device 100 may be a computer provided in the remote control device and executing a process related to the remote control.

The information processing device 100 includes one or more storage devices 110 and one or more processors 120.

The one or more storage devices 110 store a control program 111 that can be executed by one or more processors 120, and control information 112 that is necessary for the process executed by the one or more processors 120. A volatile memory, a non-volatile memory, a hard disk drive (HDD), a solid state drive (SSD) and the like are exemplified as one or more storage devices 110. The information acquired by the information processing device 100 is stored in the storage device 110 as the control information 112.

The control program 111 includes a program for generating a display signal for displaying the traveling image 4 on the display device 400, and a program for generating a display signal for performing the AR display of the estimated stop position 2 on the display device 400.

The control information 112 includes at least a reference deceleration 113. In addition, as the control information 112, the traveling image 4 acquired from the camera 200, the detection information acquired from the traveling state detection sensor 300, the vehicle specification information of the vehicle 1, the camera specification information of the camera 200, and the parameter information related to the control program 111 are exemplified.

The one or more processors 120 read the control program 111 and the control information 112 from the one or more storage devices 110, and execute the process in accordance with the control program 111 based on the control information 112. With the above, the display signal for displaying the traveling image and the display signal for performing the AR display of the estimated stop position 2 are generated. That is, each of the estimated stop position calculation processing unit 121, the coordinate conversion processing unit 122, and the rendering processing unit 123 is realized by one or more processors 120.

Note that, the one or more storage devices 110 may be configured as external devices of the information processing device 100. For example, the one or more storage devices 110 are data servers configured on a communication network. In this case, the information processing device 100 may be configured such that the information stored in the one or more storage devices 110 can be acquired by communication via the communication network.

The display device 400 performs a display in accordance with the display signal acquired from the information processing device 100. The display device 400 is, for example, a monitor provided in a cockpit in the remote control system. When the display device 400 performs the display in accordance with the display signal, the display of the traveling image 4 and the AR display of the estimated stop position 2 are realized.

The input device 500 is a device that accepts an operation by the user and outputs operation information corresponding to the operation. Examples of the input device 500 include a touch panel, a keyboard, and a switch. Alternatively, the input device 500 is an operation panel provided in the cockpit in the remote control system. Further, the input device 500 may be integrally configured with the display device 400. The operation information is transmitted to the information processing device 100. In the information processing device 100, the one or more processors 120 execute a process in accordance with the operation information, whereby a setting change by the user (for example, a change of the camera capturing the traveling image or a change of the display form) or the change of the processing parameter (for example, a change of the vehicle specification information and camera specification information) and the like are realized.

In particular, the input device 500 is configured to be able to input the set value of the reference deceleration 113. The input format of the set value may be preferably provided corresponding to the environment to which the display system 10 is applied. For example, a form which the value of the reference deceleration 113 is arbitrarily input may be adopted, or a form in which the value of the reference deceleration 113 is from several set value options may be adopted. Then, the one or more processors 120 are configured to accept the input of the set value of the reference deceleration 113, and execute the process of changing the reference deceleration 113 stored in the one or more storage devices 110 in accordance with the input set value. With the above, the reference deceleration 113 can be set corresponding to the preference and aptitude of the driver.

1-4. Display Method

Figure 12:
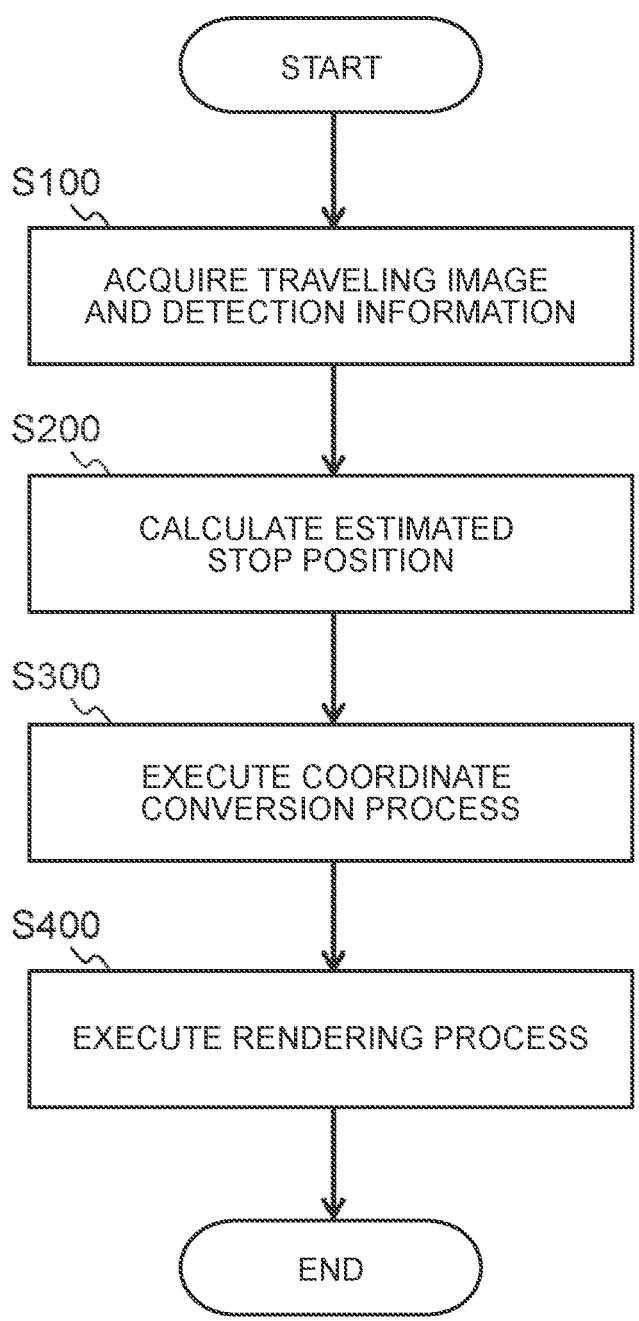
FIG. 12 is a flowchart showing a display method realized by the display system according to the first embodiment.

Hereinafter, a display method realized by the display system 10 according to the first embodiment will be described. FIG. 12 is a flowchart showing the display method realized by the display system 10 according to the first embodiment. The flowchart shown in FIG. 12 is repeated at a predetermined cycle, and each process is executed at a predetermined cycle.

In step S100, the information processing device 100 acquires the traveling image 4 captured by the camera 200 and the detection information (including the vehicle speed of the vehicle 1) detected by the traveling state detection sensor 300.

In step S200 (stop position calculation process), one or more processors 120 calculate the estimated stop position 2. Here, the one or more processors 120 calculate the estimated stop distance $x_p$ by the equation (1) based on the vehicle speed acquired in step S100 and the reference deceleration 113 stored in the one or more storage devices 110. Then, the position advanced in the estimated stop distance from the vehicle 1 along the traveling path 3 is calculated as the estimated stop position 2. The traveling path 3 is calculated from the detection information and the vehicle specification information. For example, when the vehicle 1 is steered, the traveling path 3 can be given by a steady circular turning locus. When the vehicle 1 is not steered, the traveling path 3 may be a path traveling straight in front of the vehicle 1.

In step S300, the one or more processors 120 perform coordinate conversion of the estimated stop position 2 calculated in step S200, and calculate the screen coordinate representation of the estimated stop position 2.

In step S400, the one or more processors 120 generate the display signal for displaying the traveling image 4 and the display signal for performing the AR display of the estimated stop position 2 calculated in step S300. Then, the information processing device 100 outputs the generated display signal, and the display device 400 performs the display in accordance with the display signal.

1-4. Effect

As described above, according to the first embodiment, the estimated stop position 2 is displayed to be superimposed on the traveling image 4 in the traveling direction. Further, the estimated stop position 2 is a stop position when braking is applied at the reference deceleration 113 from the current vehicle speed of the vehicle 1. With the above, when the driver attempts to stop the vehicle 1 at a desired stop position, it is possible to urge the driver to appropriately stop at the desired stop position. In particular, the issue that, even when the driver visually checks the traveling image 4 displayed on the display device and performs the driving operation without actually boarding the vehicle, the vehicle stops excessively before the desired stop position can be solved.

Figure 13:
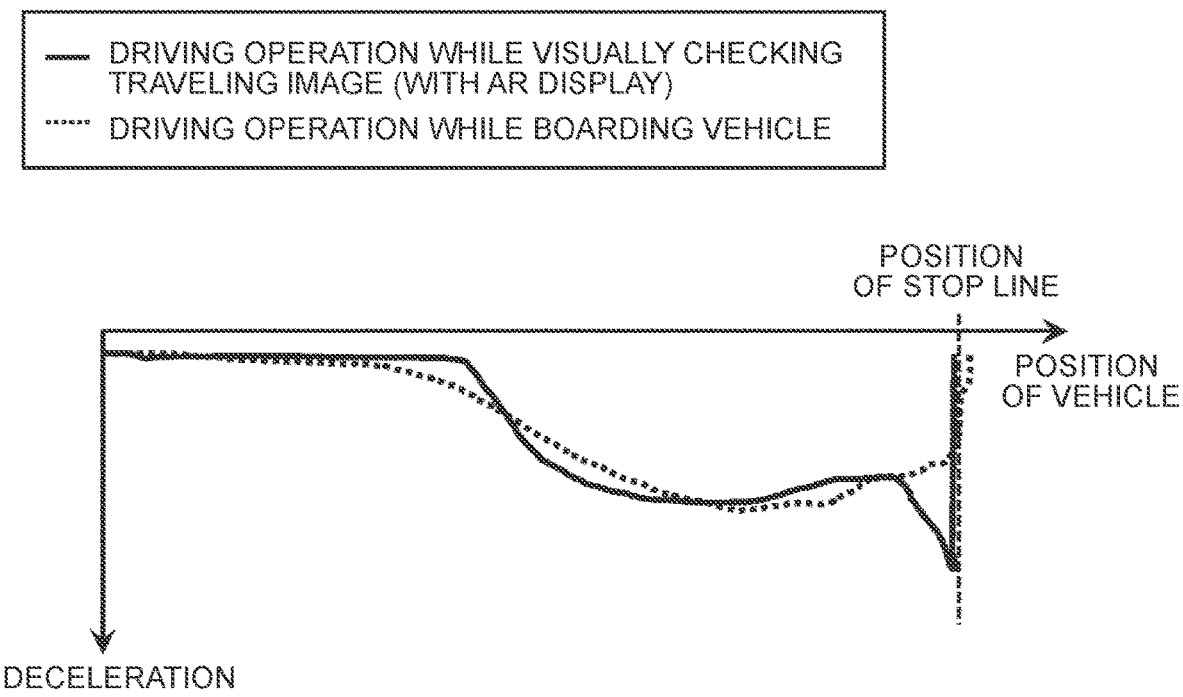
FIG. 13 is a graph showing an example of the first embodiment.

FIG. 13 shows an example of the first embodiment. FIG. 13 shows a graph similar to that of FIG. 1. Note that, FIG. 13 is an example when the reference deceleration 113 is set to 0.15 G (1.5 m/s$^2$). As shown in FIG. 13, it can be understood that the issue that the vehicle 1 stops excessively before the stop line 5 can be solved by performing the AR display of the estimated stop position 2 according to the first embodiment. Further, the driver can be expected to be able to stop the vehicle 1 closer to the stop line 5 as compared with the driving operation performed while the driver is on board the vehicle.

Further, according to the first embodiment, the input of the set value of the reference deceleration 113 is accepted, and the reference deceleration 113 is changed in accordance with the input set value.

Figure 14A:
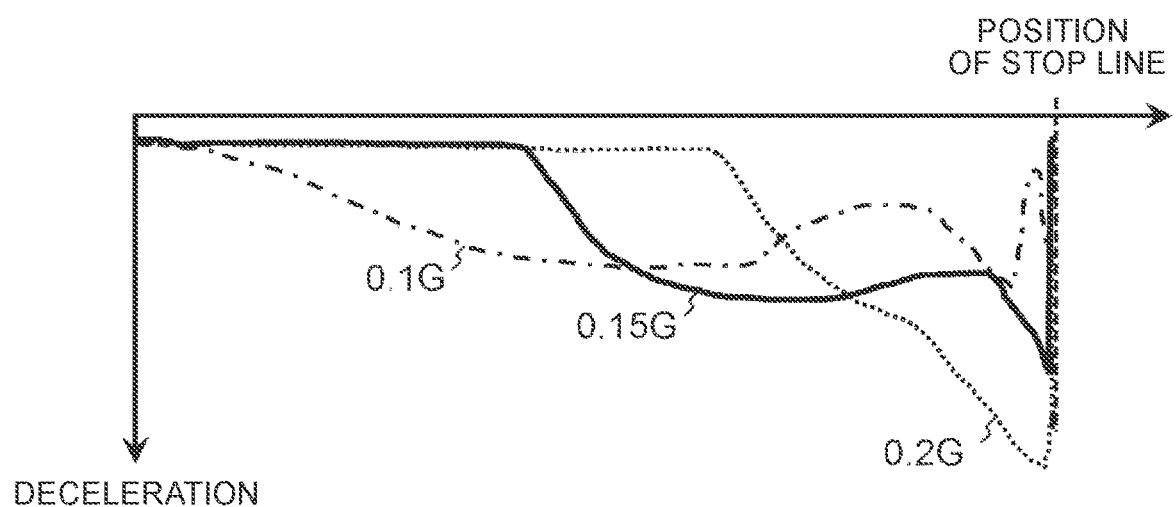
FIGS. 14A and 14B are graphs showing three examples of the first embodiment in which, when a specific driver performs the driving operation, set values of reference deceleration are different from each other.
Figure 14B:
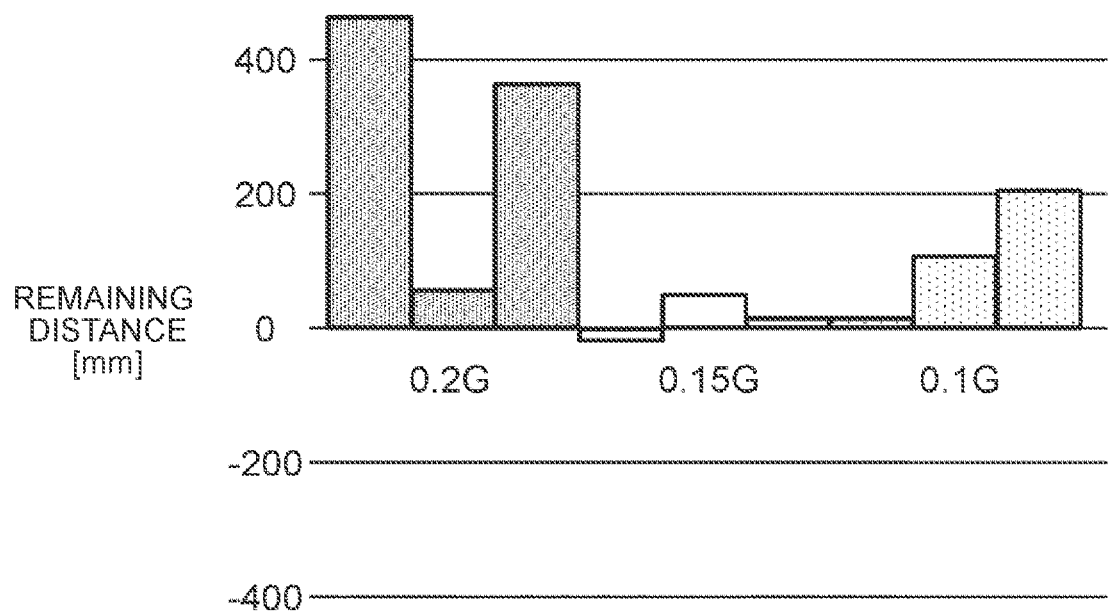

The inventors according to the present disclosure have found that the set value of the reference deceleration 113 affects the driving operation depending on the driver. FIGS. 14A and 14B show three examples of the first embodiment in which, when a specific driver performs the driving operation, the set values of the reference deceleration 113 are different from each other (0.1 G, 0.15 G, and 0.2 G). FIG. 14A shows a graph similar to that of FIG. 1. FIG. 14B shows the remaining distance to the position of the stop line 5 (positive when the vehicle 1 is before the stop line 5) for a plurality of times for each of the different set values of the reference deceleration 113. As shown in FIG. 14A, it can be understood that the set value of the reference deceleration 113 affects the driving operation. Further, as shown in FIG. 14B, the set value of the reference deceleration 113 affects the accuracy (remaining distance) of the stop position.

The reference deceleration 113 can be set as described above, whereby it is possible to correspond to the preference and aptitude of the driver.

1-5. Modifications

The first embodiment may adopt a modified embodiment as follows.

1-5-1. First Modification

The display form of the estimated stop position 2 may be configured to be different between a case where the estimated stop position 2 is before the position of the stop line 5 (shown in FIG. 7B) and a case where the estimated stop position 2 is behind the position of the stop line 5 (shown in FIG. 7C).

For example, when the estimated stop position 2 is before the position of the stop line 5, the color of the estimated stop position 2 is set to an emphasized color such as red. In addition, it is conceivable that the pattern and shape of the estimated stop position 2 are made different. Further, the configuration may be adopted in which a notification by sound, such as sounding a buzzer when the estimated stop position 2 is behind the position of the stop line 5, is issued.

The display system 10 according to the first modification can be realized in a manner such that the one or more processors 120 are configured to further execute a process of recognizing the stop line 5 captured in the traveling image 4 and calculating the position of the stop line 5, and a process of varying the display form of the estimated stop position 2 depending on whether the estimated stop position 2 is before the position of the stop line 5 or the estimated stop position 2 is behind the position of the stop line 5. Here, the recognition of the stop line 5 captured in the traveling image 4 and the calculation of the position of the stop line 5 are realized by, for example, an image recognition technique.

Adoption of the first modification makes it possible for the driver to more easily understand the timing of starting braking.

1-5-2. Second Modification

The one or more processors 120 may be configured to execute a process of accepting an input of a load of the vehicle 1 or a boarding form of the occupant, and changing the reference deceleration 113 stored in the one or more storage devices 110 in accordance with the input load of the vehicle 1 and the input boarding form of the occupant. Here, the input of the load of the vehicle 1 or the boarding form of the occupant means that, for example, precision mechanical equipment, a fragile object, or the like is loaded or that the occupant is standing in the vehicle 1. Further, the input is realized by operating the input device 500. Alternatively, a configuration may be adopted in which the load of the vehicle 1 and the boarding form of the occupant are acquired from image recognition by the camera that captures the inside of the vehicle 1.

The one or more processors 120 change the reference deceleration 113 so as to be small when, for example, precision mechanical equipment or a fragile object is loaded. Further, when the occupant is standing in the vehicle 1, the reference deceleration 113 is changed to be small. With the above, as shown in FIGS. 14A and 14B, the deceleration for braking of the vehicle 1 can be moderated. As a result, when the load of the vehicle 1 is precision mechanical instrument or a fragile object, the load can be appropriately protected. Further, when the occupant is standing in the vehicle 1, the condition of the occupant can be stabilized.

2. Second Embodiment

Hereinafter, a second embodiment will be described. In the following description, differences from the first embodiment will be described, and the contents overlapping with the first embodiment will be omitted as appropriate.

Figure 15:
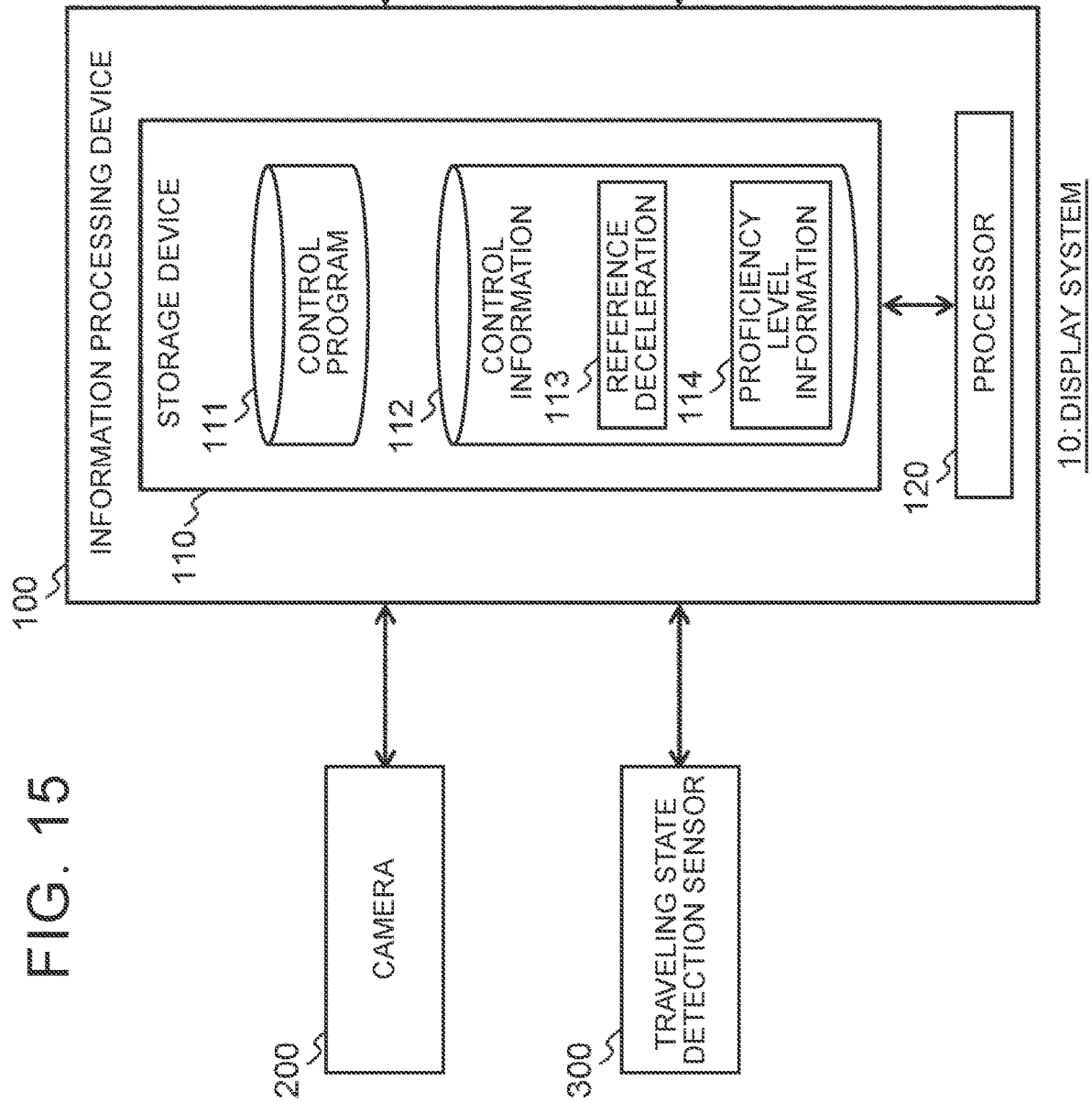
FIG. 15 is a block diagram showing a schematic configuration of a display system according to a second embodiment.

FIG. 15 is a block diagram showing a schematic configuration of the display system 10 according to the second embodiment. In the display system 10 according to the second embodiment, the one or more storage devices 110 store and manage proficiency level information 114 as the control information 112. The proficiency level information 114 is information indicating the proficiency level of a specific driver. The proficiency level uses the cumulative mileage or the driving skill as an index, for example. More specifically, as the cumulative mileage becomes longer, the proficiency level is considered to be high. Alternatively, the driving skill is evaluated based on the lateral acceleration, the longitudinal acceleration etc. detected during driving, and as the driving skill is higher, the proficiency level is considered to be high (for example, as a fluctuation of acceleration becomes smaller, the driving skill is considered to be high). The one or more storage devices 110 may store and manage the proficiency level information 114 for each of a plurality of the drivers.

Figure 16:
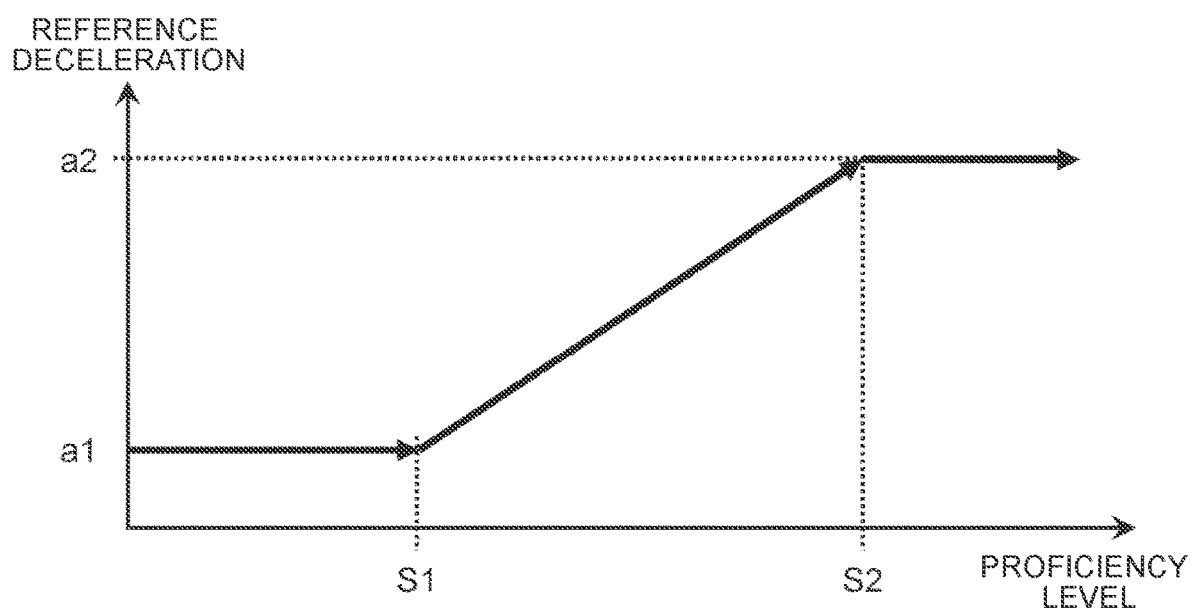
FIG. 16 is an example of a map that gives the reference deceleration to a proficiency level in the second embodiment.

The one or more processors 120 according to the second embodiment execute a process of increasing the reference deceleration 113 stored in the one or more storage devices 110 as the proficiency level becomes higher based on the proficiency level information 114. The one or more processors 120 execute, for example, a process of changing the reference deceleration 113 in accordance with a map that provides the reference deceleration 113 with respect to the proficiency level. FIG. 16 shows an example of the map that provides the reference deceleration 113 with reference to the proficiency level. When the process of changing the reference deceleration 113 is executed in accordance with the map shown in FIG. 16, the reference deceleration 113 is monotonically increased from a1 to a2 as the proficiency level increases from S1 to S2 (>S1). On the other hand, the reference deceleration 113 becomes a1 until the proficiency level becomes S1, and the reference deceleration 113 becomes a2 after the proficiency level becomes S2.

The map shown in FIG. 16 is an example, and a suitable map may be adopted depending on the environment to which the display system 10 according to the second embodiment is applied. For example, a map may be adopted in which the reference deceleration 113 is non-linearly increased as the proficiency level increases. Alternatively, a map may be adopted in which the reference deceleration 113 is discontinuously increased in a stepwise manner as the proficiency level increases.

When the proficiency level information 114 is managed for each of the drivers, the one or more storage devices 110 may be configured to manage the reference deceleration 113 for each of the drivers, and the one or more processors 120 may be configured to execute a process of changing the reference deceleration 113 for each of the drivers.

As the reference deceleration 113 decreases, the time allowance for the vehicle 1 to come close to the stop line 5 becomes longer. Therefore, a driver with a low proficiency level tends to prefer a smaller reference deceleration 113, and a driver with a high proficiency level tends to prefer a higher reference deceleration 113. Therefore, by applying the second embodiment, it is possible to provide an appropriate reference deceleration 113 corresponding to the proficiency level of the driver.

3. Third Embodiment

Hereinafter, a third embodiment will be described. In the following description, differences from the first embodiment will be described, and the contents overlapping with the first embodiment will be omitted as appropriate.

Figure 17:
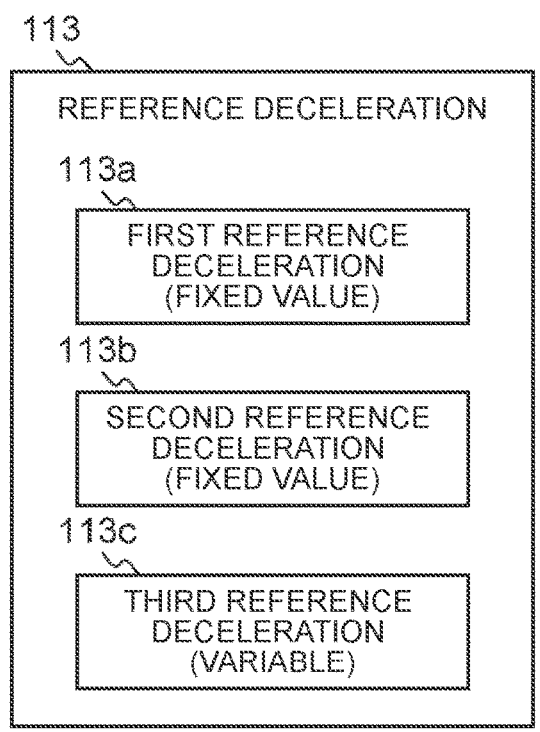
FIG. 17 is a graph showing an example of a third reference deceleration in a third embodiment.

In the third embodiment, the reference deceleration 113 includes a first reference deceleration 113*a*, a second reference deceleration 113*b* that is smaller than the first reference deceleration 113*a* by a predetermined value, and a third reference deceleration 113*c* that is variable between the first reference deceleration 113*a* and the second reference deceleration 113*b* (see FIG. 17). The first reference deceleration 113*a* and the second reference deceleration 113*b* (or a predetermined value) may be given suitable values corresponding to the environment to which the display system 10 according to the third embodiment is applied. However, the first reference deceleration 113*a* and the second reference deceleration 113*b* (or a predetermined value) may be configured so as to be settable by operating the input device 500. The third reference deceleration 113*c* varies depending on the execution of processes by the one or more processors 120. Further, the information processing device 100 is configured to be able to acquire braking state information indicating the braking state of the vehicle 1. As the braking state information, the on-off state of a stop lamp switch, the amount of depression of the brake pedal, and the like are exemplified. These may be given as the detection information of the traveling state detection sensor 300. Alternatively, a configuration may be adopted in which the information is acquired from the vehicle 1 by communication.

Figure 18:
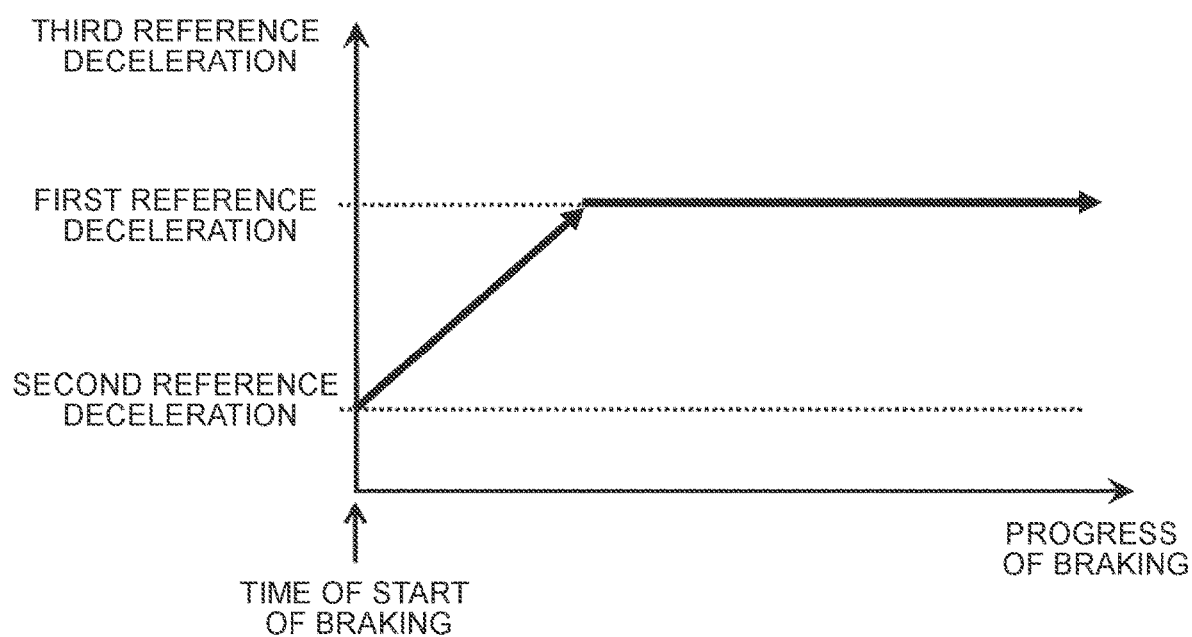
FIG. 18 is an example of a map of a third reference deceleration 113c given by a process executed by one or more processors in the third embodiment.

In the third embodiment, the one or more processors 120 execute a process of determining the start of braking of the vehicle 1 based on the braking state information. For example, the start of braking of the vehicle 1 is determined based on that the stop lamp switch is turned on or the depression of the brake pedal is detected. Then, the one or more processors 120 execute a process of gradually changing the third reference deceleration 113*c* to the first reference deceleration 113*a* in accordance with the progress of braking from the time of the start of braking, with the second reference deceleration 113*b* as the initial value. Here, the progress of braking can be determined based on the elapsed time from the time of the start of braking. That is, a determination is made that, as the elapsed time becomes longer, the braking has been progressing more. Alternatively, the progress of braking may be determined based on the braking state information. For example, a determination is made that as the integrated value of the amount of depression of the brake pedal from the time of the start of braking becomes larger, braking has been progressing more. FIG. 18 shows an example of a map of the third reference deceleration 113c given by a process executed by the one or more processors 120. In the example shown in FIG. 18, the third reference deceleration 113c is monotonously increased to the first reference deceleration 113a as the braking progresses, with the second reference deceleration 113b as the initial value. However, the third reference deceleration 113c shown in FIG. 18 is an example, and a suitable map may be adopted depending on the environment to which the display system 10 according to the third embodiment is applied. For example, a map may be adopted in which the third reference deceleration 113c increases non-linearly to the first reference deceleration 113a as the braking progresses. Alternatively, a map may be adopted in which the third reference deceleration 113c increases discontinuously to the first reference deceleration 113a in a stepwise manner as the braking progresses.

In the third embodiment, in the stop position calculation process (step S200 in FIG. 12), the one or more processors 120 calculate the estimated stop position 2 based on the second reference deceleration 113b until the time of the start of braking. On the other hand, the estimated stop position 2 is calculated based on the third reference deceleration 113c from the time of the start of braking until the third reference deceleration 113c reaches the first reference deceleration 113a. Then, after the third reference deceleration 113c reaches the first reference deceleration 113a, the estimated stop position 2 is calculated based on the first reference deceleration 113a.

As shown in FIGS. 14A and 14B, when the reference deceleration 113 becomes larger, rising of braking at the start of the braking becomes steep, and pitching of the vehicle 1 may occur. On the other hand, when the reference deceleration 113 becomes smaller, rising of braking at the start of the braking can be suppressed. However, the driving operation after the start of braking becomes excessively slow, and comfort may be impaired.

Therefore, by applying the third embodiment, while the AR display of the estimated stop position 2 calculated based on the reference deceleration 113 (the second reference deceleration 113b) that is a small value is performed until the time of the start of braking, the AR display of the estimated stop position 2 calculated based on the reference deceleration 113 (the third reference deceleration 113c) that gradually increases with the progress of braking is performed after braking is started. With the above, it is possible to suppress rising of braking at the start of braking without excessively slowing the driving operation after braking is started. As a result, the pitching of the vehicle 1 at the start of braking can be suppressed.

What is claimed is:

1. A display system comprising:
a camera that captures a traveling image of a vehicle in a traveling direction;
a display device;
one or more storage devices that store a reference deceleration indicating a predetermined deceleration; and
one or more processors, wherein
the one or more processors are configured to execute
a process of acquiring a vehicle speed of the vehicle,
a stop position calculation process of calculating an estimated stop position indicating a stop position when braking is applied at the reference deceleration from the vehicle speed,
a process of displaying the estimated stop position superimposed on the traveling image on the display device,
a process of recognizing a stop line captured in the traveling image and calculating a position of the stop line, and
a process of varying a display form of the estimated stop position and sounding a buzzer,
depending on whether the estimated stop position is before the position of the stop line or the estimated stop position is behind the position of the stop line,
wherein:
the reference deceleration includes a first reference deceleration, a second reference deceleration that is smaller than the first reference deceleration by a predetermined value, and a third reference deceleration that is variable between the first reference deceleration and the second reference deceleration;
the one or more processors are configured to further execute
a process of acquiring braking state information of the vehicle,
a process of determining a start of braking of the vehicle based on the braking state information, and
a process of gradually changing, from a time of the start of braking, the third reference deceleration to the first reference deceleration corresponding to an elapsed time or based on the braking state information, with the second reference deceleration as an initial value; and
the stop position calculation process includes
a process of calculating the estimated stop position based on the second reference deceleration until the time of the start of braking,
a process of calculating the estimated stop position based on the third reference deceleration from the time of the start of braking until the third reference deceleration reaches the first reference deceleration, and
a process of calculating the estimated stop position based on the first reference deceleration after the third reference deceleration reaches the first reference deceleration.

2. The display system according to claim 1, wherein the stop position calculation process includes:
a process of calculating an estimated stop distance $x_p$ based on an equation (1) below where the vehicle speed is v, a reference deceleration is $a_s$, and a constant is $\alpha$; and
a process of calculating a position advanced from the vehicle along a traveling path by the estimated stop distance $x_p$ as the estimated stop position;

(First equation)

$$x_p = \alpha * \frac{v^2}{a_s}. \tag{1}$$

3. The display system according to claim 1, wherein the one or more processors are configured to execute:
a process of accepting an input of a set value of each of the first reference deceleration and the second reference deceleration value; and a process of changing the first reference deceleration and the second reference deceleration stored in the one or more storage devices in accordance with the set value.

4. The display system according to claim 1, wherein:
the one or more storage devices store proficiency level information indicating a proficiency level with respect to a specific driver of the vehicle; and
the one or more processors are configured to further execute a process of changing the first reference deceleration and the second reference deceleration stored in the one or more storage devices to increase as the proficiency level becomes higher based on the proficiency level information.

5. A display method for displaying a traveling image of a vehicle in a traveling direction on a display device, the traveling image being captured by a camera, the display method comprising:
calculating an estimated stop position indicating a stop position when braking is applied at a reference deceleration indicating a predetermined deceleration from a vehicle speed of the vehicle;
displaying the estimated stop position superimposed on the traveling image on the display device;
recognizing a stop line captured in the traveling image and calculating a position of the stop line; and
varying a display form of the estimated stop position and notifying by a buzzer sound, depending on whether the estimated stop position is before the position of the stop line or the estimated stop position is behind the position of the stop line,
wherein:
the reference deceleration includes a first reference deceleration, a second reference deceleration that is smaller than the first reference deceleration by a predetermined value, and a third reference deceleration that is variable between the first reference deceleration and the second reference deceleration;
the display method further includes
acquiring braking state information of the vehicle,
determining a start of braking of the vehicle based on the braking state information, and
gradually changing, from a time of the start of braking, the third reference deceleration to the first reference deceleration corresponding to an elapsed time or based on the braking state information, with the second reference deceleration as an initial value; and
the calculating the estimated stop position includes
calculating the estimated stop position based on the second reference deceleration until the time of the start of braking,
calculating the estimated stop position based on the third reference deceleration from the time of the start of braking until the third reference deceleration reaches the first reference deceleration, and
calculating the estimated stop position based on the first reference deceleration after the third reference deceleration reaches the first reference deceleration.

6. The display method according to claim 5, wherein the calculating the estimated stop position includes:
calculating an estimated stop distance $x_p$ based on an equation (1) below where the vehicle speed is v, a reference deceleration is $a_s$, and a constant is $\alpha$; and
calculating a position advanced from the vehicle along a traveling path by the estimated stop distance $x_p$ as the estimated stop position;

(First equation)

$$x_p = \alpha * \frac{v^2}{a_s}. \tag{1}$$

7. The display method according to claim 5, further comprising:
accepting an input of a set value of each of the first reference deceleration and the second reference deceleration; and
changing the first reference deceleration and the second reference deceleration in accordance with the set value.

8. The display method according to claim 5, further comprising:
managing proficiency level information indicating a proficiency level with respect to a specific driver of the vehicle; and
changing the first reference deceleration and the second reference deceleration to increase as the proficiency level becomes higher based on the proficiency level information.

* * * * *